(12) United States Patent
Martinez et al.

(10) Patent No.: US 12,073,053 B1
(45) Date of Patent: Aug. 27, 2024

(54) VIRTUAL SMART DEVICE CONTROLS

(71) Applicant: UIPCO, LLC, San Antonio, TX (US)

(72) Inventors: Noe Alberto Martinez, San Antonio, TX (US); Megan Sarah Jennings, San Antonio, TX (US); Christopher Russell, The Colony, TX (US); Justin Royell Nash, Little Elm, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/932,799

(22) Filed: Sep. 16, 2022

Related U.S. Application Data

(60) Provisional application No. 63/249,300, filed on Sep. 28, 2021.

(51) Int. Cl.
G06F 3/04815 (2022.01)
A63F 13/537 (2014.01)
G06F 3/0484 (2022.01)
G16Y 40/30 (2020.01)

(52) U.S. Cl.
CPC ........ G06F 3/04815 (2013.01); A63F 13/537 (2014.09); G06F 3/0484 (2013.01); G16Y 40/30 (2020.01)

(58) Field of Classification Search
CPC .. G06F 3/04815; G06F 3/0484; A63F 13/537; G16Y 40/30
See application file for complete search history.

(56) References Cited

U.S. PATENT DOCUMENTS

| | | | | |
|---|---|---|---|---|
| 9,940,752 B2* | 4/2018 | Tommy | ................ | H04L 12/282 |
| 10,553,085 B1* | 2/2020 | Derickson | .............. | G08B 7/062 |
| 11,043,095 B1* | 6/2021 | Derickson | ............ | G06Q 90/205 |
| 11,131,973 B2* | 9/2021 | Becea | ................. | G05B 19/042 |
| 11,583,770 B2* | 2/2023 | Delmonico | ............ | G08B 7/066 |
| 11,850,515 B2* | 12/2023 | Delmonico | ........... | G06F 3/0481 |
| 2009/0191529 A1* | 7/2009 | Mozingo | .............. | G09B 19/003 463/43 |
| 2016/0195864 A1* | 7/2016 | Kim | .................... | H04L 41/0886 709/221 |
| 2016/0198499 A1* | 7/2016 | Lee | ....................... | H04W 4/026 455/450 |
| 2017/0169614 A1* | 6/2017 | Tommy | ................. | H04L 12/282 |
| 2019/0104437 A1* | 4/2019 | Bartfai-Walcott | ...... | H04L 45/24 |
| 2019/0129607 A1* | 5/2019 | Saurabh | .................. | G06F 3/011 |

(Continued)

Primary Examiner — Kenny Nguyen
(74) Attorney, Agent, or Firm — Plumsea Law Group, LLC

(57) ABSTRACT

A method and system for creation of a virtual home center is disclosed. The system includes a plurality of IoT or smart devices connected to a network and arranged throughout a physical space, such as a house, apartment building, or other physical structure or edifice. In some embodiments, the devices can serve as beacons and receive sensed information via internal sensors and/or from other nearby devices such as a smoke detector. The sensors can be used to generate and render a virtual home within a virtual environment (e.g., VR/AR). In one example, the system is configured to communicate information between the virtual environment and IoT devices in the user's real home. If the user would like to read and/or modify controls of any IoT devices, they can enter the virtual environment as a virtual avatar and locate the room with the desired smart device.

15 Claims, 12 Drawing Sheets

(56) References Cited

U.S. PATENT DOCUMENTS

| | | | |
|---|---|---|---|
| 2020/0175123 A1* | 6/2020 | Roberts | G06F 3/015 |
| 2021/0116990 A1* | 4/2021 | Song | A63F 13/25 |
| 2021/0201635 A1* | 7/2021 | Fernandez-Orellana | G08B 7/066 |
| 2022/0108622 A1* | 4/2022 | Derickson | G06Q 10/06 |
| 2022/0274019 A1* | 9/2022 | Delmonico | G06F 16/9537 |

* cited by examiner

VIRTUAL SMART DEVICE CONTROLS

CROSS-REFERENCE TO RELATED APPLICATION

This application claims the benefit of U.S. Provisional Patent Application Ser. No. 63/249,300 filed on Sep. 28, 2021 and titled "Virtual Smart Device Controls", the disclosure of which is incorporated by reference in its entirety.

TECHNICAL FIELD

The present disclosure generally relates to methods and systems for controlling devices in the real-world while interacting within a virtual environment. More specifically, the system communicates information between a virtual environment and IoT devices in the user's real home.

BACKGROUND

When a person is away from home or otherwise at a distance from a control interface, there may be occasions in which changes to the operation of home appliances and devices are desired. More specifically, as people spend more time immersed in virtual reality sessions, whether for work or play, they will find leaving the virtual world to perform mundane tasks such as changing the level of a speaker volume or turning off lights in a bedroom upstairs to be jarring. Such interruptions can also be cumbersome and make the return to immersion in the virtual world less enjoyable.

There is a need in the art for a system and method that addresses the shortcomings discussed above.

SUMMARY

In one aspect, a method for causing real-world changes in response to interactions with virtual objects. The method includes a first step of receiving, at a client computing device, a first input by a virtual avatar representing a first user, the first input corresponding to a virtual control request being submitted to a first virtual IoT device that represents a first IoT device. A second step includes transmitting, from the client computing device and in response to the first input, a first control signal to the first IoT device, the first control signal including device operation instructions based on the virtual control request. The method further includes a third step of obtaining, at the client computing device and from the first IoT device, a confirmation indicating the requested operation has been performed by the first IoT device, and a fourth step of presenting, via the first virtual IoT device, a status message indicating execution of the requested operation at the first (real-world) IoT device In another aspect, a method of improving safety outcomes for occupants of a real-world building using gamification is disclosed. The method includes a first step of presenting, at a first computing device, a simulation of a virtual building representing the real-world building, the simulation further including an emergency event occurring at a first location of the virtual building, a second step of receiving, at the first computing device, a first input by a first virtual avatar representing a first user, the first input corresponding to a navigation selection to move the first virtual avatar from a second location to a third location in the virtual building, a third step of moving, in the simulation and in response to receiving the first input, the first virtual avatar from the first location to the second location, and a fourth step of presenting, via the first computing device, a metrics dashboard comprising a first score assigned to the first virtual avatar based on navigation of the first virtual avatar in response to the emergency event.

In another aspect, a system for causing real-world changes in response to interactions with virtual objects includes a processor and machine-readable media. The machine-readable media include instructions which, when executed by the processor, cause the processor to receive, at a client computing device, a first input by a virtual avatar representing a first user, the first input corresponding to a virtual control request being submitted to a first virtual IoT device that represents a first IoT device, and to transmit, from the client computing device and in response to the first input, a first control signal to the first IoT device, the first control signal including device operation instructions based on the virtual control request. In addition, the instructions cause the processor to obtain, at the client computing device and from the first IoT device, a confirmation indicating the requested operation has been performed by the first IoT device, and present, via the first virtual IoT device, a status message indicating execution of the requested operation.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

A system and method for a creation of a virtual home center is disclosed. The system includes a plurality of IoT or "smart devices" connected to a network and arranged throughout a physical space, such as a house, apartment building, or other physical structure or edifice. In some embodiments, the devices can serve as beacons and receive sensed information via internal sensors and/or from other nearby devices such as a smoke detector. The sensors can be used to generate and render a virtual home within a virtual environment (e.g., VR/AR). In one example, the system is configured to communicate information between the virtual environment and IoT devices in the user's real home. If the user would like to read and/or modify controls of any IoT devices, they can enter the virtual environment as a virtual avatar and locate the room with the desired smart device. In some embodiments, as the user's avatar moves into different parts of the virtual home, the system automatically determines the relevant IoT devices in the room and uploads real-time information. For example, a user may enter their "virtual hallway" and read off the current thermostat temperature. They may then change the temperature on the virtual thermostat, which triggers a change in the real thermostat. More specifically, the system contemplates the use of a remote signal to cause an IoT computing device to make a change in a real-world environment in response to a signal received in the virtual world via the user's avatar.

In some embodiments, the system leverages its network and information about the location of each device to train users in the event of an emergency. For example, the system could provide virtual simulations of disasters (such as fire) by triggering virtual fire alarms. In one embodiment, the system could test the user's knowledge of how to evacuate by observing how the user's avatar travels through the virtual home during the simulated emergency. The system could also simulate different kinds of fires, for example, and test how different fires could be detected by the current IoT devices. If the system determines there is an insufficient number of smoke detectors, or that they are poorly placed, the system could provide recommendations for new detectors and/or guidance on optimized locations for one or more detectors. The system could also predict optimized exit routes for people in the home based on their bedroom locations and the placement of fire detectors, sprinklers, etc. In one example, the system can suggest routes through the house to the nearest exit in order to prepare the user for emergency situations in the real-world, and/or gamify evacuation drills.

Figure 1:
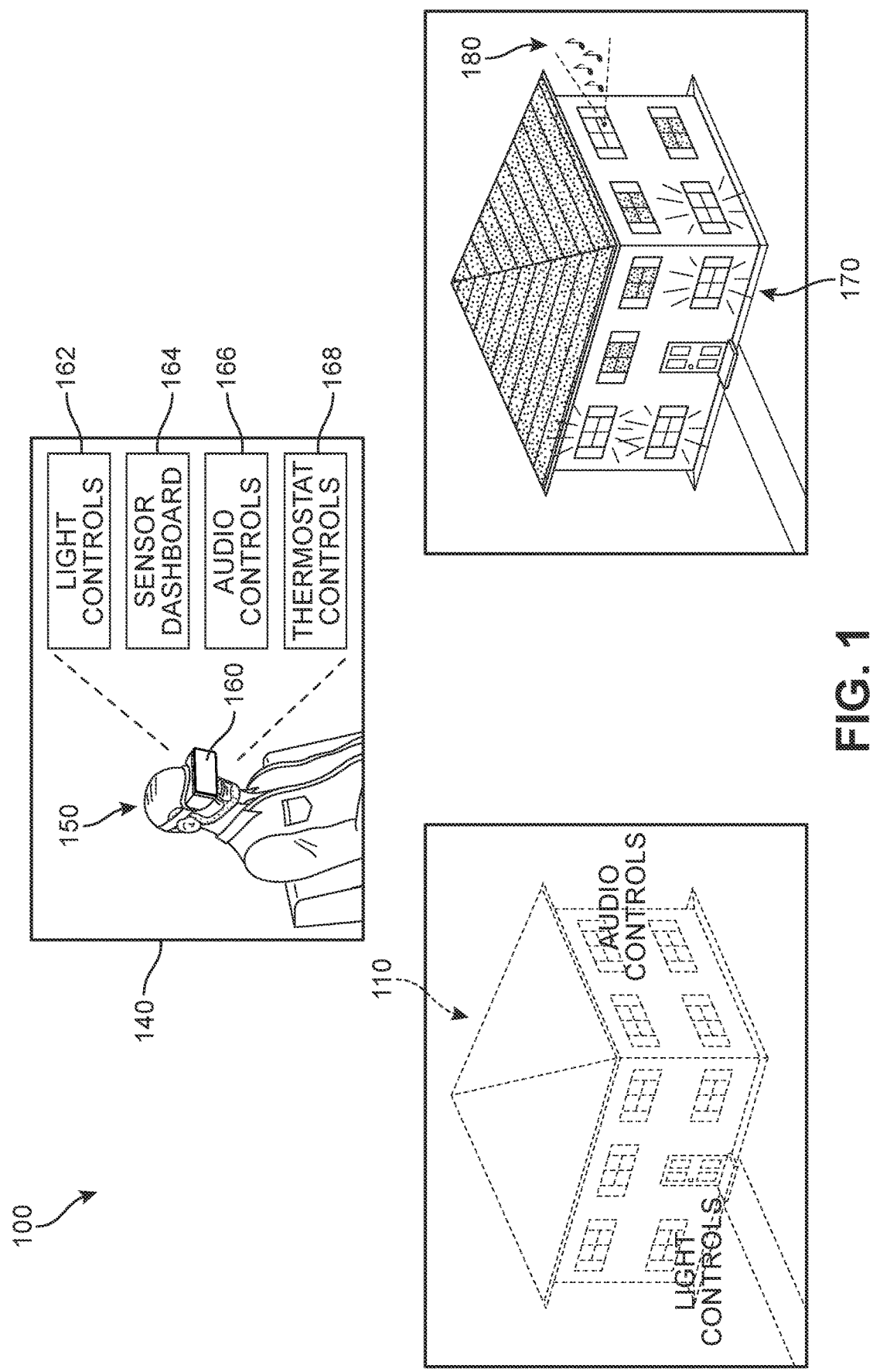
FIG. 1 is an overview of an implementation of a virtual reality IoT control system configured to enable control of real-world IoT devices, according to an embodiment.

Referring now to FIG. 1, for purposes of introduction, a first user 150 is shown seated in a room 140 that is remote relative to his actual (real-world) first home 120 while using an HMD system. As depicted in FIG. 1, an HMD system as represented by a first computing device ("first device") 160 that allows a user to view a displayed image of a virtual scene. While FIG. 1 presents an HMD system comprising a headset, other embodiments can include another wearable computing device such as a smart helmet, smart visor, smartglasses, smart face-shield, smart contact lenses, or other head-mounted computing device display devices. In some other embodiments, the first user 150 can perform the described action using a virtual home center app running on any computing device with a display.

In FIG. 1, a first virtual home 110 is shown with dotted lines, and serves as a virtual representation of the actual real-world first home 120. In this case, the first virtual home 110 illustrates a virtual environment in which the first user 150 is immersed. Upon entering first virtual home 110, the first user 150 can, in different embodiments, be provided with a virtual space that is substantially similar to the layout of first home 120. In this example, the first user 150 can be understood to be 'walking' or otherwise moving through the simulation of his home and finding, at the appropriate expected locations, various virtually rendered smart "IoT" devices and sensors, generally mimicking or representing some or all of the actual IoT devices in his first home 120.

For example, as the first user 150 walks around the first level of the first virtual home 110, he is able to 'see' virtual thermostat controls 168 on a wall near his bedroom, virtual audio controls 166 on a table in the living room, virtual light controls 162 on a wall near the kitchen, and a virtual smart sensor dashboard 164 reporting the values of one or more sensor data being received from devices around the real-world house. In this case, the first user 150 wishes to engage various features of his home in order for his first home 120 to appear occupied while he is away. He selects a radio station from virtual audio controls 166 to be emitted as audio output 180, and then navigates to the virtual light controls 162 to turn on a set of lights 170 in some rooms of his first home 120. Thus, while the first user 150 is remote from his actual home, he is able to easily engage with the devices as if he were actually on site. This activity occurs without the user being required to access various apps on another computing device that would link him to the IoT devices. Instead, the first user 150, already immersed in the virtual world (e.g., playing a game, participating in a virtual conference) can simply switch briefly to a different virtual environment, perform various house-related activities, and move back to the ongoing virtual experience. This type of arrangement further facilitates the trend towards increasing the realism of the virtual experience, allowing the user to maintain their immersion uninterrupted regardless of whether more mundane aspects of their home are to be managed. Furthermore, the first user 150 is familiar with the layout of their own home, and the locations of each IoT device. This allows him/her to readily navigate to the desired control device without a map. In addition, in some embodiments, the virtual reality experience can allow the user to select a room to navigate to immediately ('teleporting' rather than 'walking' through the virtual home, which, depending on the size of the structure, can be quite expansive) to expedite their access to the controls.

Figure 2A:
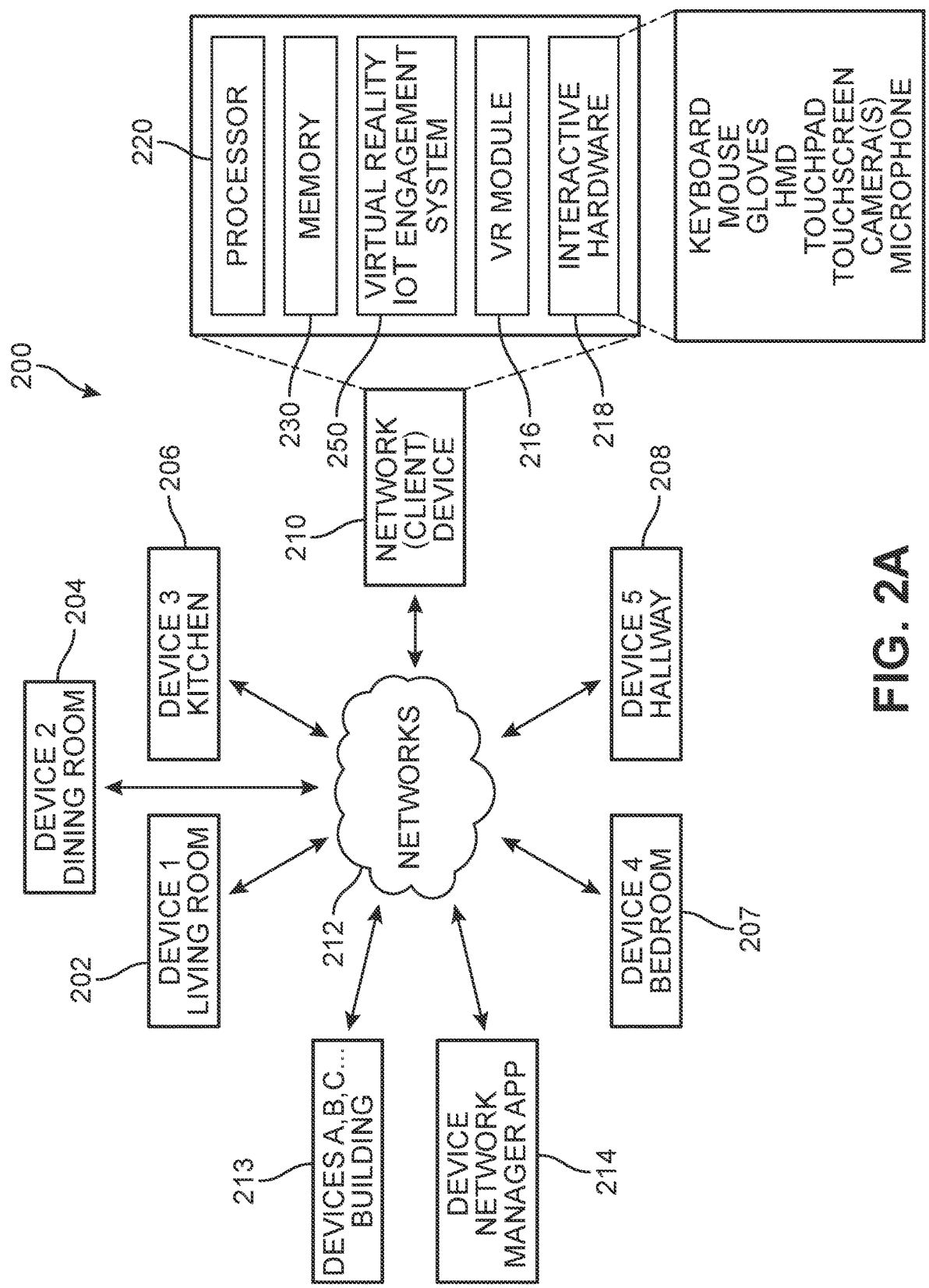
FIGS. 2A and 2B together depict a schematic diagram of a system for controlling IoT devices through a simulation and improving safety outcomes for occupants of the virtual home, according to an embodiment.

In order to provide the reader with a greater appreciation of the embodiments, FIG. 2A depicts an overview of an embodiment of a virtual reality (VR) IoT engagement environment ("environment") 200 in which a device network is linked to a VR IoT engagement system ("IoT system") 250 running on a client device 210. A more detailed schematic diagram of the IoT system 250 is presented in FIG. 2B. The IoT devices may vary and be limited in functionality to navigation signals and basic communication or sensor data collection, or may refer to more comprehensive smart assistant computing devices which are also configured to provide an array of other functions, including a microphone for receiving voice commands and/or a display for viewing information and inputting touch inputs.

In different embodiments, various components of environment 200 are configured to communicate over networks 212, could include one or more Wide Area Networks (WANs), Wi-Fi networks, Bluetooth or other Personal Area Networks, cellular networks, as well as other kinds of networks. It may be appreciated that different devices could communicate using different networks and/or communication protocols. The devices can include computing or smart devices as well as more simple speakers or light-emitting devices configured with a communications module. The communication module may include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. In many cases, the communication module is a wireless connection; however, wired connections may also be used. For example, the communication module may include a wired serial bus such as a universal serial bus or a parallel bus, among other connections.

Furthermore, in different embodiments, the client device 210 may include provisions for communicating with, and processing information from, nearby devices. Moreover, the other devices communicating with client device 210 may also include some or all of these provisions. As seen in FIG. 2A, client device 210 may include one or more processors 220 and memory 230. Memory 230 may comprise a non-transitory computer readable medium. Instructions stored within memory 230 may be executed by the one or more processors 220. Client device 210 may also include IoT system 250, a VR module 216 for supporting and enabling a virtual reality environment, and interactive hardware 218 that can vary but typically includes one or more of a keyboard, mouse, gloves, handset, game controller, HMD, touchpad, touchscreen, camera(s), microphone, etc. Although references to VR are used in the application, it should be understood that VR technology can also or alternatively and interchangeably refer to augmented reality, mixed reality, and 360-degree systems, or any other system in which digitally reproduced images or portions thereof are presented to a user in a manner wherein they seem to be, or may be perceived as, 'real'. In addition, in some embodiments, more straightforward computing devices with a display, such as a laptop, mobile phone, tablet, or desktop may be used to perform the described operations.

Figure 2B:
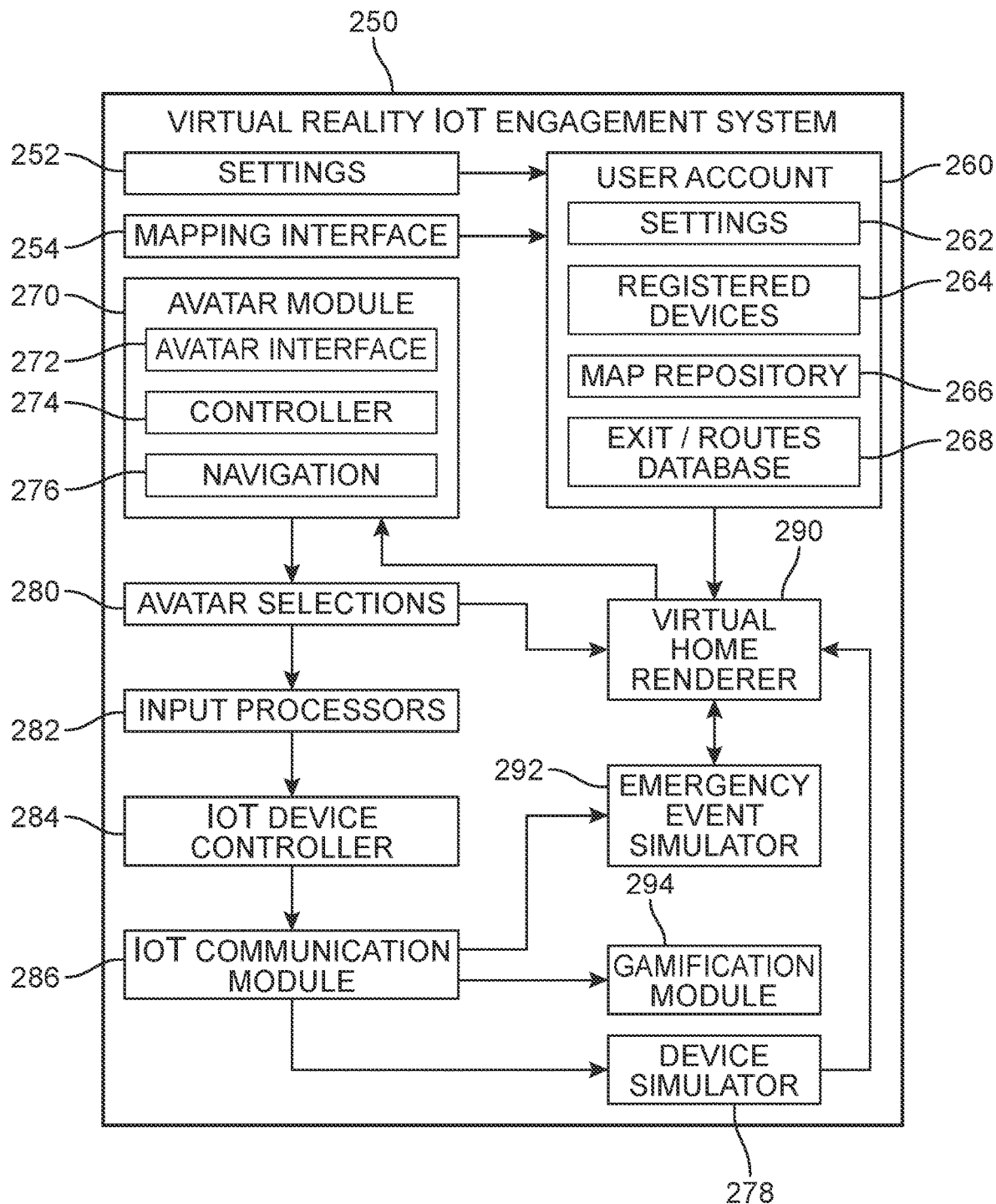

An end-user can interact with and adjust settings associated with the IoT system 250, for example via client device 210. Referring to FIG. 2B, in some embodiments, the IoT system 250 can offer a device registration and profile interface ("registration") 252 for establishing and/or managing an account with IoT system 250. In some embodiments, an application may be available that connects a user's device (for example, via a WiFi or cellular connection) with an online service provider to change the settings stored in the cloud, and automatically update the corresponding settings and information. The application can offer a user interface that may be accessed via any user computing device configured for connection to a network. Thus, while in some cases the client device 210 may be local (i.e., within the same physical space as the device network) in other cases the client device 210 can be located remote relative to the plurality of IoT devices (e.g., IoT devices are at home while the client device 210 is at work).

In different embodiments, the IoT system 250 can be configured to offer content via an application using native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In some embodiments, the interface can include options for registering a device. In addition, a plurality of data input fields can also be presented. Some non-limiting examples of such fields include fields directed to identification of the device and its location (e.g., Room 21, Conference Room, etc.). As shown in the non-limiting example of the FIG. 2A, each device can be assigned a particular room in a home, such that the profile for first device 202 indicates its position in the living room, second device 204 in the dining room, third device 206 in the kitchen, fourth device 207 in the bedroom, and fifth device 208 in the hallway. Alternatively, or additionally, the IoT devices that are registered can be stationed in a building as employer devices 213 in cases where the system is implemented in a workplace. In some embodiments, each device communicates individually with the IoT system 250, while in other embodiments, there is a central 'hub' or manager station ("device network manager") 214 that coordinates the activity and operation of the devices belonging to the user.

Returning to FIG. 2B, once the user has registered a user account 260 may be established, through which he/she may select or update various system preferences and settings 262 and manage the IoT devices that have been registered with the IoT system 250 as registered devices module 264. The information stored in the registered devices module 264 enables the IoT system 250 to communicate with the user's registered devices and transmit control signals to cause changes at the corresponding devices in the real-world (e.g., including user permissions, access, device identifiers, device model/appearance, device functions/features, etc.) as well as receive information about the devices' performance in the real-world in order to reflect those parameters in the virtual space.

In addition, as noted earlier, the IoT system 250 is configured to generate a virtual home that can generally resemble the user's real-world home. For example, during or after registration, the user can begin to provide information via a mapping interface 254 that will be used to create the virtual home landscape. In one example, the mapping interface 254 provides a set of tools from which pre-set objects, elements, and layouts can be used to describe the space, or the input may be inputted in a freeform manner. In addition, in some embodiments, once the system is connected to the registered devices, the system will request and receive data from the devices themselves regarding the space in which they are installed. This data (e.g., sensor data including image data, sound data, infrared data, etc.) that can be used by the system to automatically determine what the user's home may look like and generate a best-fit layout that the user can adjust if desired. Once the user approves a layout, it may be added to a map repository 266, where it can be accessed by the user as desired for changes, deletions, or viewing. In some embodiments, the user may enroll multiple real-world spaces, and each of these spaces can be virtually rendered, stored in map repository 266.

In addition, in different embodiments, the user can indicate via the map what the exits are and possible routes to each exit from different starting points, to be stored as exits/routes database 268. In some embodiments, the system itself can automatically assess the provided layout details and determine what the most likely best evacuation routes and exits are and store the assessment in the database 268.

Once the user has established an account and approved a virtual home layout, they can at any time enter their virtual home, rendered by a virtual home renderer module 290 that receives information from the user account 260, the IoT devices (via IoT communication module 286), as well as optional emergency event simulator 292 and gamification module 294. In different embodiments, access to the virtual home is provided via an avatar module 270, whereby the user is virtually represented and interacts with the virtual home through an avatar interface 272. The avatar is able to move through the virtual home environment with commands made available through a navigation module 276, and select device features via controller module 274. The avatar's selections 280 will be received by the virtual home renderer 290 to cause changes in the appearance of the virtual environment as the user navigates and/or selects various tasks. In addition, the selections 280 are received by an input processor 282 that translates the virtual command to its real-world counterpart signal. This data is then sent to an IoT device controller 284, which determines which device and what features are to be adjusted, and generates the appropriate control signal for transmission to the IoT device via IoT communication module 286 in a remote signaling event. As a general matter, a remote signaling event refers to the process and period during which the system issues a control signal to a remote user device over a network, and the control signal causes the user device to respond and/or have a change in operation/status.

In different embodiments, IoT devices may send status updates to the IoT communication module 286. The information received can be used to update the presentation of the virtual IoT devices via a device simulator module 278 for use by the virtual home renderer 290. As a non-limiting example, if an avatar adjusts a virtual thermostat IoT device (i.e., presented as a virtual object shown in the virtual environment) to heat the house to a higher temperature, a control signal is sent from the system to the real-world thermostat IoT device causing the device to begin heating the house to the selected temperature. In turn, the thermostat IoT device will communicate to the system whether the control signal was received and successfully implemented in real-time, or if there were any issues. If successful, a display for the virtual thermostat IoT device may indicate that the real-world device has been adjusted successfully. If unsuccessful, the display may indicate an error or other fail message, and/or information about the reason for the failure. In some embodiments, the virtual IoT device is selectable, such that selection of the object triggers display of control options and/or status/monitoring data. In other embodiments, once the virtual avatar moves directly next to or near the virtual object, the display of control options occurs automatically.

In some embodiments, the virtual IoT device can be configured as an executable virtual object. In other words, in some embodiments, the system can cause an application or other feature to be launched, for example, in response to a detected user intent to interact with the virtual object. The associated executable virtual object may be any object that may be executed on the HMD in response to a determined user intent to interact with the object. As non-limiting examples, the virtual object may include image content, audio content, text, an interactive application, an invitation to join an activity, such as a game, occurring at the location of the user, a virtual web page, an invitation to make a phone call, etc. For purposes of this application, the virtual object can include an interactive dashboard or controller that allows the avatar to adjust real-world device activity. It will be understood that the term "executable virtual object" as used herein signifies any computer-implemented object that may be associated with a real object (e.g., an IoT device) whereby monitoring and control options are presented to a user based upon the association with the real object.

In different embodiments, the proposed systems can also offer a mechanism by which users can practice emergency procedures, as will be discussed below in FIGS. 7 and 8. For example, the system can be configured to present various types of emergency situations (e.g., fire, flood, carbon monoxide, etc.) and dynamically adapt these to the given layout for the virtual home. In some embodiments, the system can adjust variables based on the location and types of devices in the virtual home, as well as the layout of the home itself. The emergency can be customized for the virtual home and simulated via emergency event simulator 292. In some embodiments, the training of users in safety responses in the real-world can be conducted through the virtual home environment. In one example, the training can be gamified (see FIG. 8) through tools provided by gamification module 294, such that the selections made by the avatar are evaluated and rated, encouraging users to improve their performance.

Figure 3A:
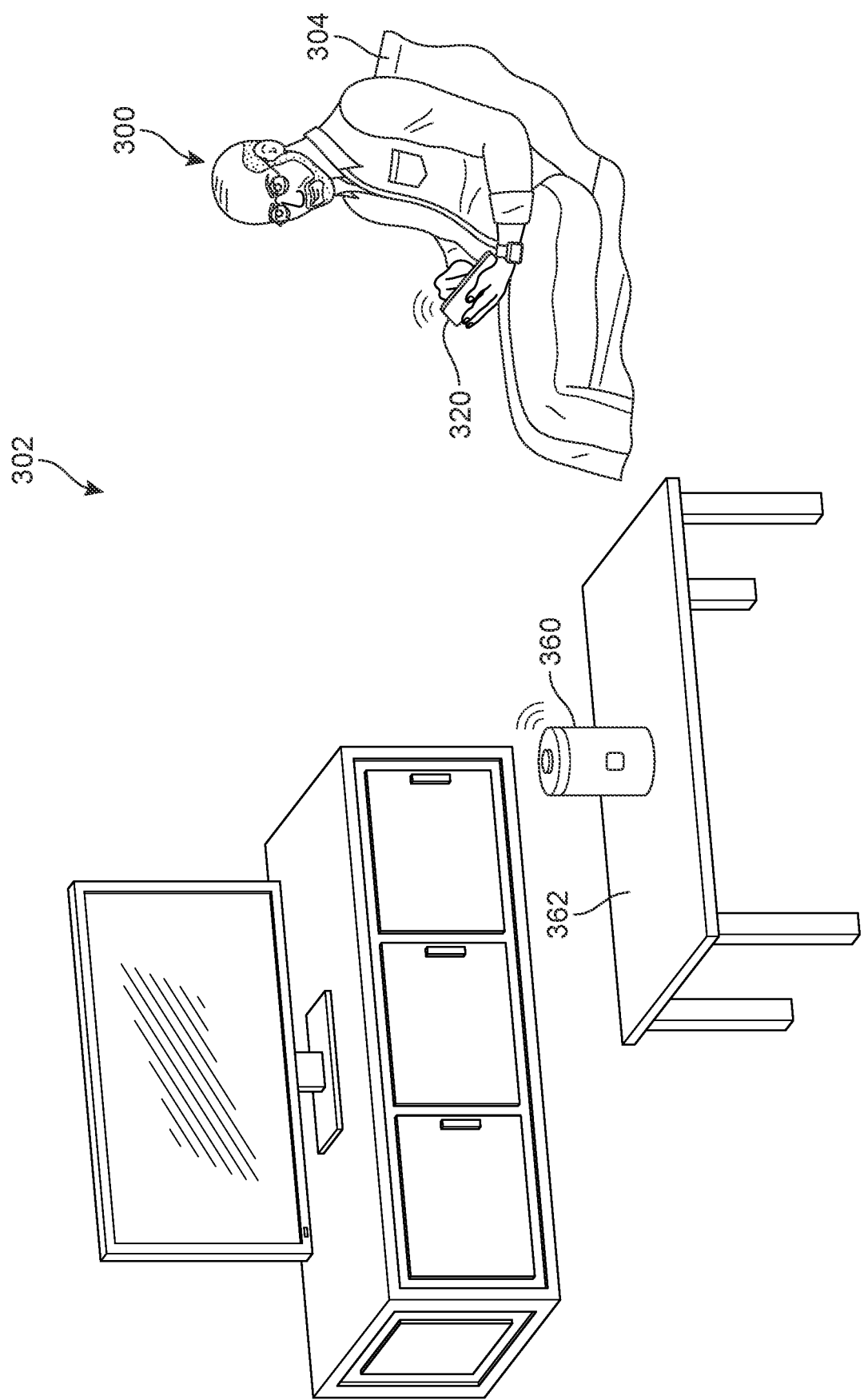
FIGS. 3A and 3B are an illustration of an end-user enrolling IoT devices in a home to an account linked to the virtual reality IoT control system, according to an embodiment.
Figure 3B:
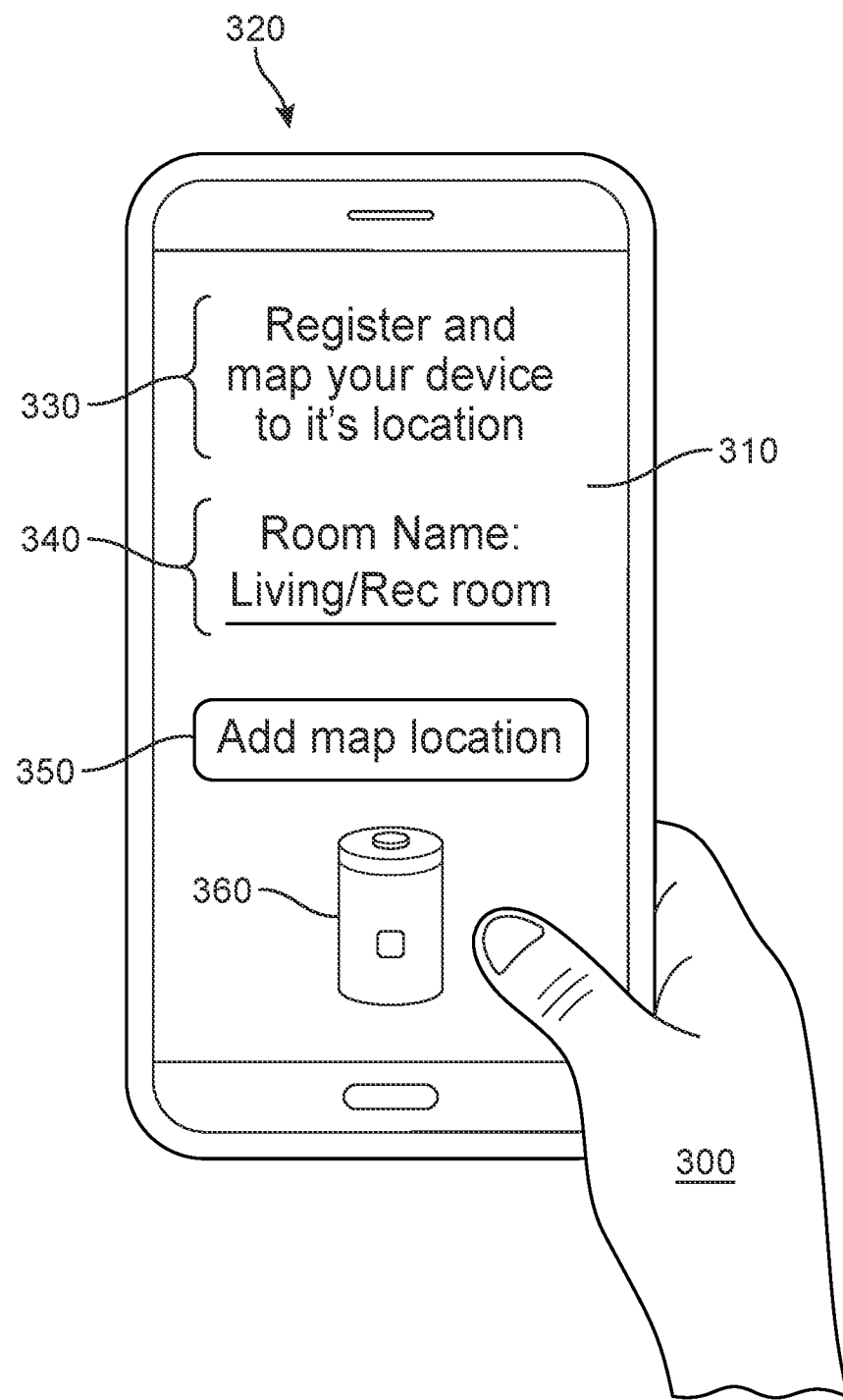
Figure 4:
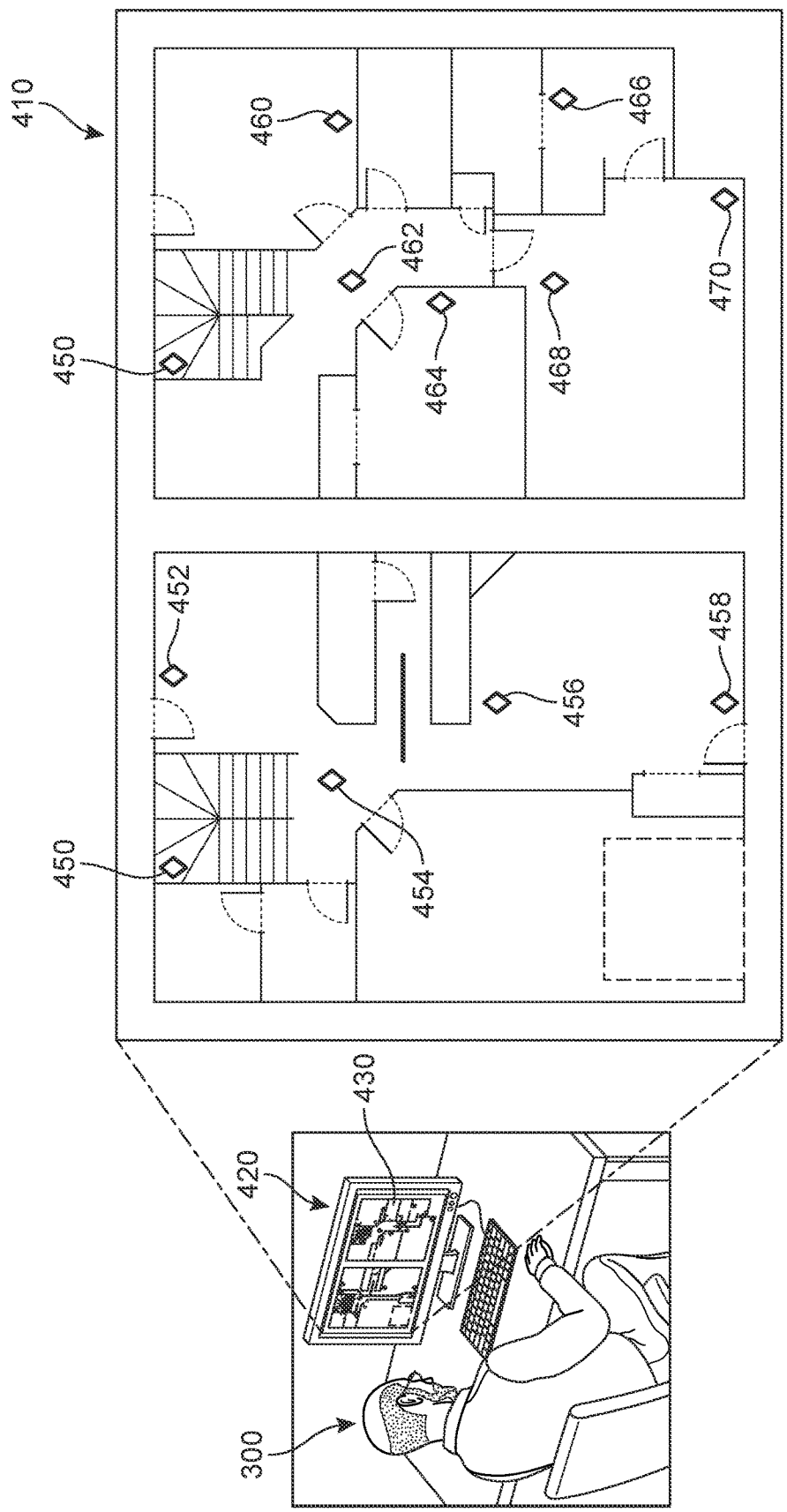
FIG. 4 is an illustration of the end-user of FIGS. 3A and 3B mapping the home and assigning multiple IoT devices to various rooms in the house, as well as designating an evacuation route and exits, according to an embodiment.

Further information on registration and pre-programmed mapping is provided with respect to FIGS. 3A, 3B, and 4. Referring now to FIG. 3A, a user 300 is depicted at a first time seated on a sofa 304 in a living room space 302 while accessing a device registration application on mobile computing device 320. In different embodiments, mobile computing device 320 can refer to any type of computing device as described herein. The user 300 is attempting to connect a newly obtained first IoT device 360, shown here disposed on an adjacent table 362, to his device manager profile. In FIG. 3B, an example of an interface 310 is presented on a touchscreen display of mobile computing device 320 offering content via native controls included in the interface 310. In some embodiments, the interface 310 can include a welcome or header message 330, as shown in FIG. 3B ("Register and map your device to its location"). In addition, one or more data input fields can also be presented. An example of such a field is shown in FIG. 3B, including first input field 330 ("Room Name:") and input ("Living/Rec Room"). In other embodiments, the user 300 can be provided with a drop-down or other list to select a room or room type (e.g., Living Room, Master Bedroom, Foyer, Bathroom, etc.).

Once the location is selected and submitted, the application can be configured to communicate the information over a network to the designated device (here device 360), for example over a personal area network (PAN), short-range wireless communication (e.g., Bluetooth®, NFC), a local area network (LAN), etc. In other embodiments, the application 310 can convey the information over a network to a server, which can update the user's online management account and device profile to include the location information for the selected device. In different embodiments, the location information may be stored locally by the device and/or remotely on a user's cloud management account. In some cases, the user can further assign a name to an individual device, assign multiple devices to a single group, assign or identify a room name, and many other functions. In addition, the interface 310 can provide a plurality of selectable options, such as navigation options (e.g., "Back", "Save", "Next"), or additional menu options for accessing other features or aspects of the device or user profile. In some embodiments, this registration process can also be performed over the phone with a service representative.

It should be understood that the text, images, and specific application features shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the client's system, including spaced apart from, adjacent to, or around the user interface. In other words, the figures present only one possible layout of the interface, and do not in any way limit the presentation arrangement of any of the disclosed features.

In some embodiments, the interface 310 also offers an opportunity for the user 300 to map the device network to the specific physical space in which it is being integrated. For example, mapping option 350 may open a new window or application feature whereby the user can input information describing the building as a whole and pre-programmed information that indicates the optimal exit routes from each room or space in the building. As one example, in FIG. 4, user 300 is shown at a client device 420 accessing a mapping interface 430 on a display. Once the user has inputted data describing the arrangement of his or her home or building, this layout 410 can be used to facilitate the mapping of the device network. In some other embodiments, a central server or cloud-computing platform or some other device could the automatically determine the routes using uploaded maps, diagrams, architectural drawings of the building, as well as using a map generated based on positional information obtained from the devices of the device network (e.g., positional information from the devices is used to construct a map of the house).

For each room in the house, the user can provide an identification of the best exit route, or the mapping interface 430 can be configured to generate the most likely best route based on the start point and desired end point. The user herself may also input the preferred exit route, as well as 'backup' exit routes that may be identified in case the preferred exit route is deemed too dangerous. For example, the user may identify a sequence of intermediate navigation locations to take the user along a path from the current location to the designated exit. For example, if the user is in an upstairs bedroom in a house and the safe zone is outside, the set of intermediate navigation locations may include a location in an upstairs hallway, a location on a staircase, and a location in a living room adjacent a front door.

In FIG. 4, it can be seen in the schematic displayed on a home layout 410 of the mapping interface 430 that eleven IoT devices (i.e., on the ground floor, a first device 450 located on the stairwell, a second device 452 located in a dining room, a third device 454 located in a foyer, a fourth device 456 located in a first part of the living room, a fifth device 458 located in a second part of the living room (nearer to the front door), and on the second floor, again the first device 450 is represented on the stairwell, a sixth device 460 located in a first bedroom, a seventh device 462 located in a hallway, an eighth device 464 located in a second bedroom, a ninth device 466 located in a bathroom, a tenth device 468 located in a first part of the master bedroom, and an eleventh device 470 located in a second part of the master bedroom nearer to the bathroom) comprise the device network arranged through the home. In different embodiments, the devices may be mapped via an indoor positioning system (IPS). For example, a user may open or launch mapping interface 430 that is configured to use IPS and/or other indoor localization techniques to create a map of the home or portions thereof. In one embodiment, one or more of the devices may include an RFID tag to generate location information.

In other embodiments, the mapping process can be performed in an automatic or semi-automatic fashion. The devices can, for example, generate and transmit positional information and send the location information to the central server or cloud computing platform, or to the mapping interface 430. For example, as the device is being added to the network, it may prompt the user via an LCD or other display or voice queries to confirm its location (e.g., kitchen, laundry room, etc.) using voice, touch, or button-based inputs. In some cases, the device(s) may be equipped to determine GPS coordinates, Wi-Fi location, or cellphone tower location information and transmit this information to the server to attempt to automatically construct a map of the space.

Figure 5:
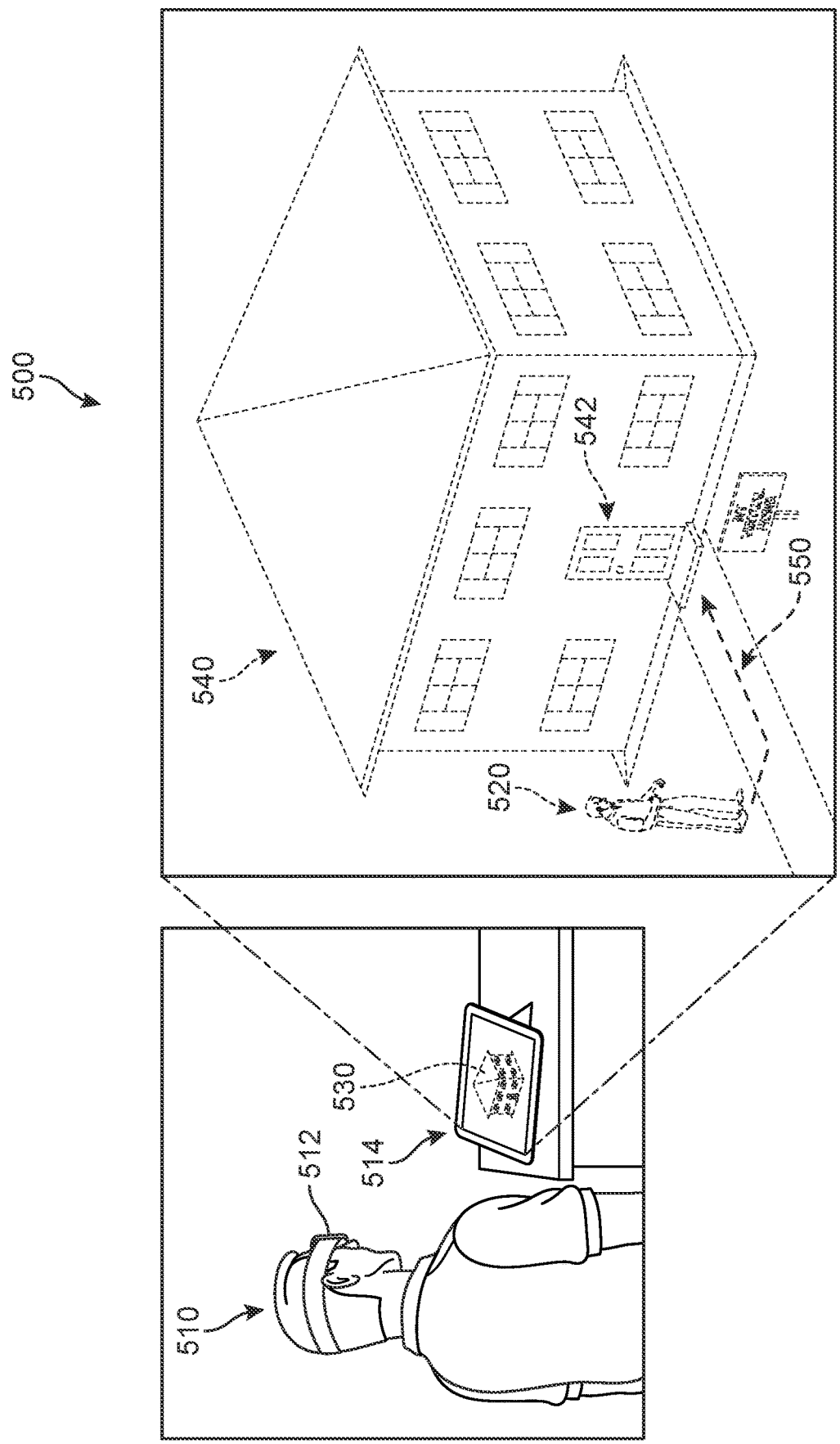
FIGS. 5 and 6 are a depiction of the end-user causing changes to their real-world IoT devices' operation during immersion in a virtual reality simulation, according to an embodiment.
Figure 6:
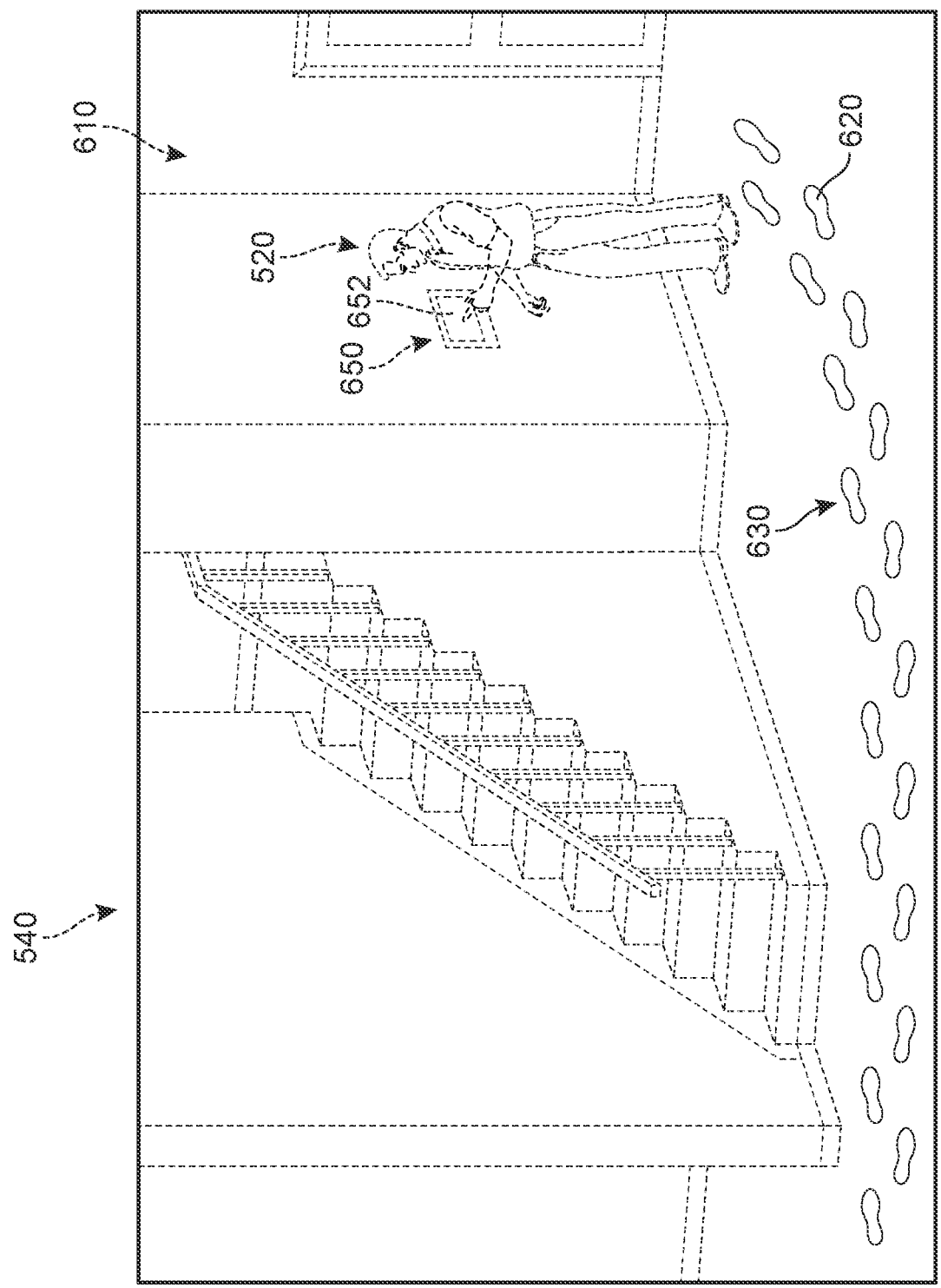

It should be appreciated that each of the IoT devices can be configured to provide different functionality and/or features that, when linked to the virtual world, can enable virtual selections to cause tangible changes in the real-world home. For example, as discussed in FIGS. 2A and 2B, each IoT device may be wired to one or more home systems such as HVAC, lighting, audio, security, window treatment, smoke and carbon monoxide detectors, irrigation, etc. For purposes of illustration, one example of a virtual smart home experience is shown in FIGS. 5 and 6. In FIG. 5, a second user 510 is wearing an HMD 512. For convenience to the reader, a tablet device 530 presents a view 530 of virtual environment 500 in which the second user 510 is now immersed.

As shown in the illustration of the virtual environment 520, a virtual avatar ("avatar") 520 corresponding to the second user 510 is standing outside of a second virtual home 540 that was registered earlier with the system as discussed in FIGS. 3A, 3B, and 4 above. The avatar 520 moves along a virtual pathway 550 toward a virtual front door 542 of the second virtual home 540. The avatar 520 then selects the command for opening the door 542, in order to enter the interior virtual space of the second virtual home 540. This is depicted in FIG. 6, where footsteps 620 along a 'floor' 630 of hallway 610 for the second virtual home 540 show the path the avatar 520 travels before arriving at a hall space 540 with a wall on which a virtual thermostat 650 appears. The avatar 520 can walk directly to the virtual thermostat 650 and view its virtually rendered display 652, just as they would view the actual thermostat display in their real-world home. In one example, the avatar 520 may simply check the status of the HVAC system via the virtual thermostat. In another example, the proposed system is configured to enable the second user—via their avatar—to make changes to the operation of the HVAC system, such as adjusting temperature for some or all of the house, setting a schedule, or powering the unit on or off. These selections made by the avatar 520 will then be reflected back to the real-world home over a network. In some embodiments, the virtual display 652 can present feedback about the performance of the selected operations as they occur in the house.

As discussed above, in different embodiments, the proposed system can also be configured to promote the readiness of occupants of the house or other facility to possible emergency conditions in which an evacuation is warranted by offering a gamification approach. As a general matter, gamification is an umbrella term for the use of video-game elements in non-gaming systems to improve user experience and user engagement. It can be appreciated that in different embodiments, the proposed systems are configured to enable users to employ gamification techniques to increase preparedness to emergency events. For example, gamification provides instant access to performance feedback—in some cases, this can allow a family (or employer) to presents a "leader-board" so that the user immediately knows where they stand among their peers, and can be motivated to improve their own time/score. Gamification can also build employee/family engagement. One way to do this is by using a token-based system within the organization the rewards employees for various virtual safety practice sessions. In one example, the employer or parent can allow employees or dependents to "cash-in" these tokens and points for real benefits. Furthermore, it has been shown that gamification can increase learning retention. Two examples of this are now shown with reference to FIGS. 7 and 8.

Figure 7:
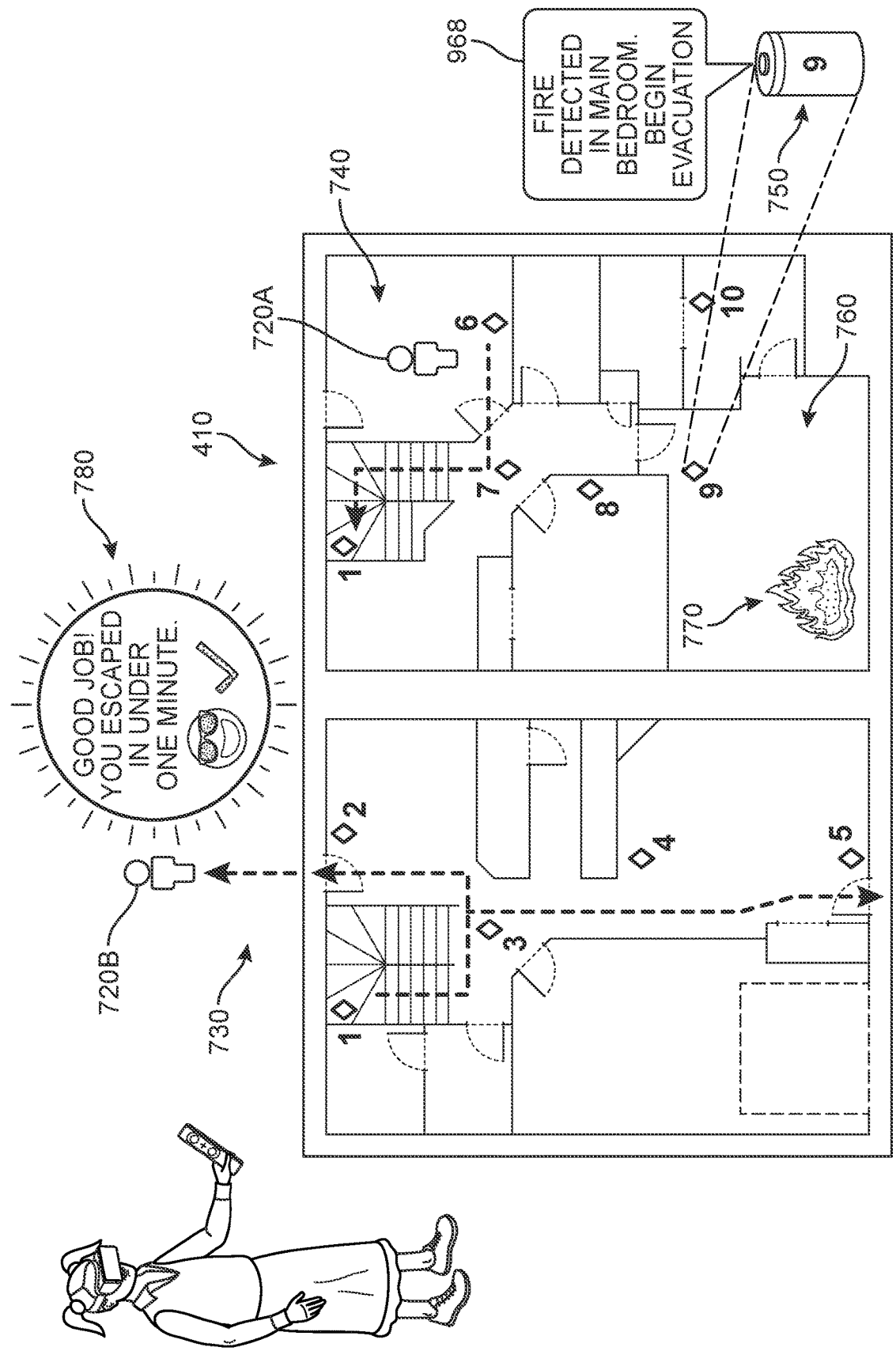
FIG. 7 depicts an example of applying gamification techniques to improve safety outcomes for occupants of a home, according to an embodiment.

In FIG. 7, a secondary occupant 710 of the home (with the user 300 of FIG. 3A), such as a minor daughter of the user, is shown as she practices an evacuation scenario generated by the system. It should be understood that while the drawings illustrate one example of a home environment within which one or more of the devices, methods, systems, services, and/or computer program products described further herein can be applicable, any other structure may implement said systems. In different embodiments, a structure can include a plurality of rooms, separated at least partly from each other via walls. The walls can include interior walls or exterior walls. Each room can further include a floor and a ceiling. Devices can be mounted on, integrated with and/or supported by a wall, floor, ceiling or other surfaces. The home environment depicted in FIG. 7 includes a two-story structure, such as a house, office building, garage, townhome, or mobile home. It will be appreciated that the system can also be integrated into an environment that does not encompass the entire structure, such as an apartment, condominium, or office space. Furthermore, the system can control and/or be coupled to devices outside of the actual structure.

In this example, the occupant 710 starts from her bedroom 740, represented as virtual avatar child 720a. In different embodiments, in the event that an emergency situation is identified, network devices may receive sensed information from nearby smart devices such as smoke detector 540 or other devices arranged throughout the house, and determine that an evacuation is warranted. As noted earlier, in some cases, one or more devices may be configured to determine whether it is in a dangerous situation by contrasting normal or ambient conditions, such as temperature or the presence of smoke, with current conditions. For example, if the device network receives temperature data from a nearby temperature sensor that includes very hot temperatures, the system may infer that the environment is close to a fire and therefore that area is not a safe zone. As a specific example, a temperature sensor located near the master bedroom 760 may receive data that the system uses to determine an emergency situation is occurring and an evacuation is warranted. In FIG. 7, the system can simulate such an event in a virtual environment.

Occupant 710 selects navigation options via a computing device 712 and hand-held controller 714 to move through a virtual representation of the layout 410 of her home while a simulated fire 770 is detected in master bedroom 760 by an IoT device 750 (e.g., device icon labeled #6: "Fire detected in main bedroom. Begin evacuation"). She moves down the stairs and out the back door to an exterior environment 730, indicated by a virtual avatar child 720b. Her response time is measured by the system, which then presents her with a virtual reward badge 780 ("Good job! You escaped in under one minute."). It may be appreciated that the 'reward' that is presented can be customized for the age/type of user in order to better incentivize the practice and improvement of evacuation simulations. For example, the user 300 can promote readiness by asking his children to compare their evacuation response times and provide a real-world reward, or another incentive as they show improvement in their own response times. In this case, an emoji is presented, encouraging the daughter to continue performing well. In other cases, a particular time or score can be used to trigger various rewards such as an hour to play a different game or some other increment of time, or in-app 'cash' to spend on virtual objects. In other words, each successful practice of safety unlocks a reward for the child (or other person).

Thus, with the aid of information collected by local stationary IoT devices arranged in the home that are virtually mimicked in the VR-environment, an occupant can practice various safety-related scenarios. For example, during a fire, the system could receive information from a smart smoke sensor. The system can determine which smoke sensor is nearest to the source of fire and use that information to infer that the room where that smoke detector is located must be avoided. If that room includes the primary exit, the system can move to the next listed exit. The occupant 710 can then practice in the same conditions to prepare for such a possibility. Similarly, if a fire was determined to have spread across the entire ground floor, the occupant could instead practice an exit from a window, or be trained to await emergency services. By using multiple types of information from different kinds of sources, the system may better infer the probability that a given location is safe or dangerous and virtually train the user based on its pre-programmed routes and exits.

Figure 8:
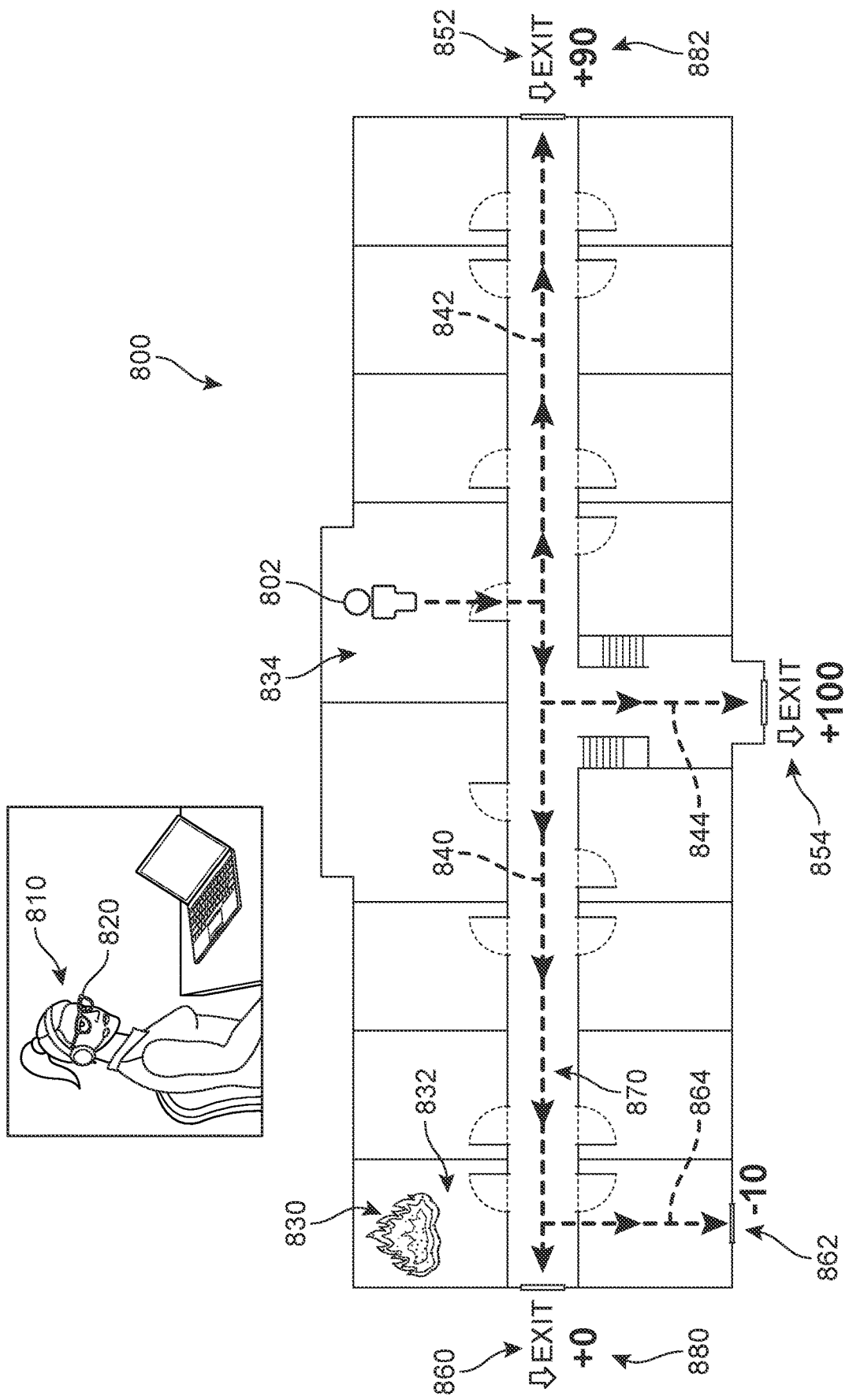
FIG. 8 depicts an example of applying gamification techniques to improve safety outcomes for occupants of a workplace, according to an embodiment.

Similarly, in FIG. 8, employers can also make use of such gamification features provided by embodiments of the proposed systems to promote workplace safety. In FIG. 8, an employee 810 is seated in her office while wearing a pair of smartglasses 820. She is viewing a virtual simulation representing office layout 800 in which she is able to move an employee avatar 802 through the virtual office space via controls connected to her smartglasses 820. In this example, a fire 830 has been virtually generated in a first office 832 toward a first end 880 of the building. In this case, the employee 810 is—via the game—being asked to move from her own second office 834 as employee avatar 802 toward the nearest emergency exit. Based on the path she chooses (for example, a first route 840, a second route 864, a third route 844, and a fourth route 842) she may increase her score. If she 'walks' to a first exit 854 via third route 844, she receives the maximum score (+100 points) because this is considered the quickest way out of the building from her start point. If she moves to a second exits 852 via fourth route 842, she receives a high score (+90 points), as this route is also relatively quick and avoids any dangerous zones. However, if she proceeds down the first route 840 and/or second route 864, she brings herself closer to the fire 830 and the system diminishes her score accordingly. For example, if she escapes via first exit 860 using first route 840, she receives no points, because of (a) the increased time taken to escape and (b) the close proximity to the fire. In addition, if she selects the second route 864 via to escape a third exit 862, she is actually penalized (−10 points) because she has taken the longest possible escape route, and the route took her close to the fire.

In different embodiments, other paths not illustrated can also be associated with various point levels. In some embodiments, the system can move the fire to different locations in the virtual environment to test the employee in different scenarios and the corresponding 'correct' routes and exits. In another example, the system can move the starting point of the employee avatar 802 to different locations relative to a virtual fire to similarly test the employee in different scenarios and the corresponding 'correct' routes and exits. In another example, some routes may be blocked off or there may be other gamified virtual obstacles or dangers that the employee must adapt to. For example, if the employee is in a wheelchair and on an upper floor, their optimal escape route/behavior will be different and may be dependent on other employees' behavior, necessitating VR group-based training sessions where two or more employees must work together to determine the most effective escape route. The points earned can be converted to real-world benefits for the employee (e.g., cash bonus, food, vouchers, time off, etc.). In some embodiments, the system is configured to allow the employer to customize the virtual experiences for each employee to test their skills based on their experience. It can be appreciated that such a tool can be especially helpful in training new employees or if the office is relocated to a new building. In one example, such training can occur remotely, before the employee even begins working in the new building, so that when they arrive, they are already familiar with the layout and are comfortable locating the various exits.

Figure 9:
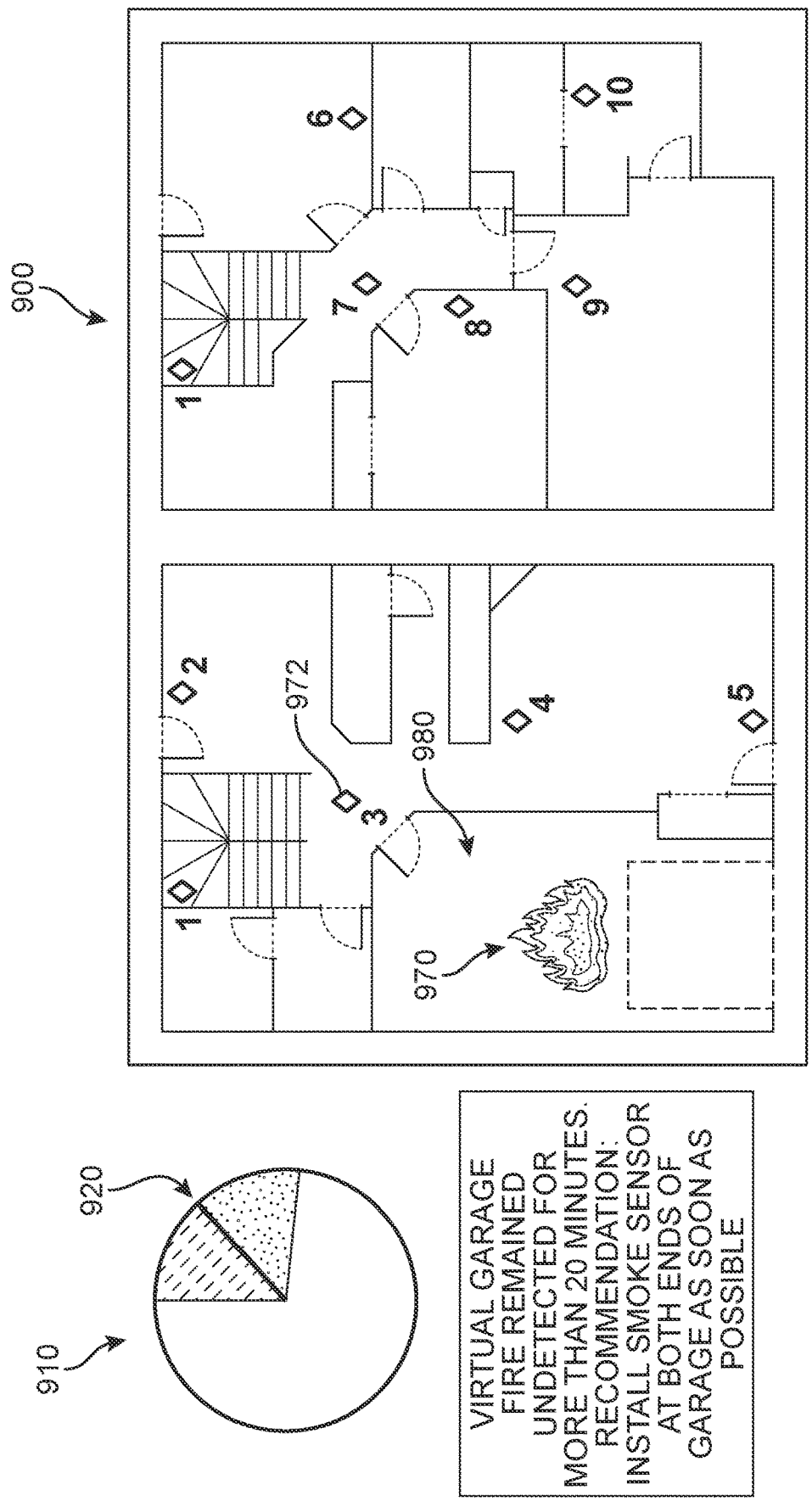
FIG. 9 is a schematic illustration of a house layout in which a simulated test of the home's emergency response system is conducted, according to an embodiment.

Referring now to FIG. 9, in different embodiments, the proposed systems include provisions to improve household or building monitoring systems. For example, the system can run simulations of emergency events in a virtual layout 900 and estimate how long before the IoT devices currently installed and arranged in the layout would sense and recognize the danger and warn the occupant(s). In FIG. 9, a fire 970 has started in a garage 980, where no IoT device is installed. The system tests the remaining devices and determines that more than 20 minutes passed following the start of the fire before an IoT sensor 972 was triggered. This is represented by stopwatch symbol 910. A dividing line 920 shows the target time by which the fire should have been detected. Because the simulation exceeded the target time, the system determines the current arrangement is insufficient, and presents message 930 for the user ("Virtual garage fire remained undetected for more than 20 minutes. Recommendation: Install smoke sensor at both ends of garage as soon as possible") that includes an automatically generated recommendation for improving the outcome. Thus, based on data generated using the virtual simulation, the system can derive insights and recommendations that improve the overall safety of the user's home or other building.

Figure 10:
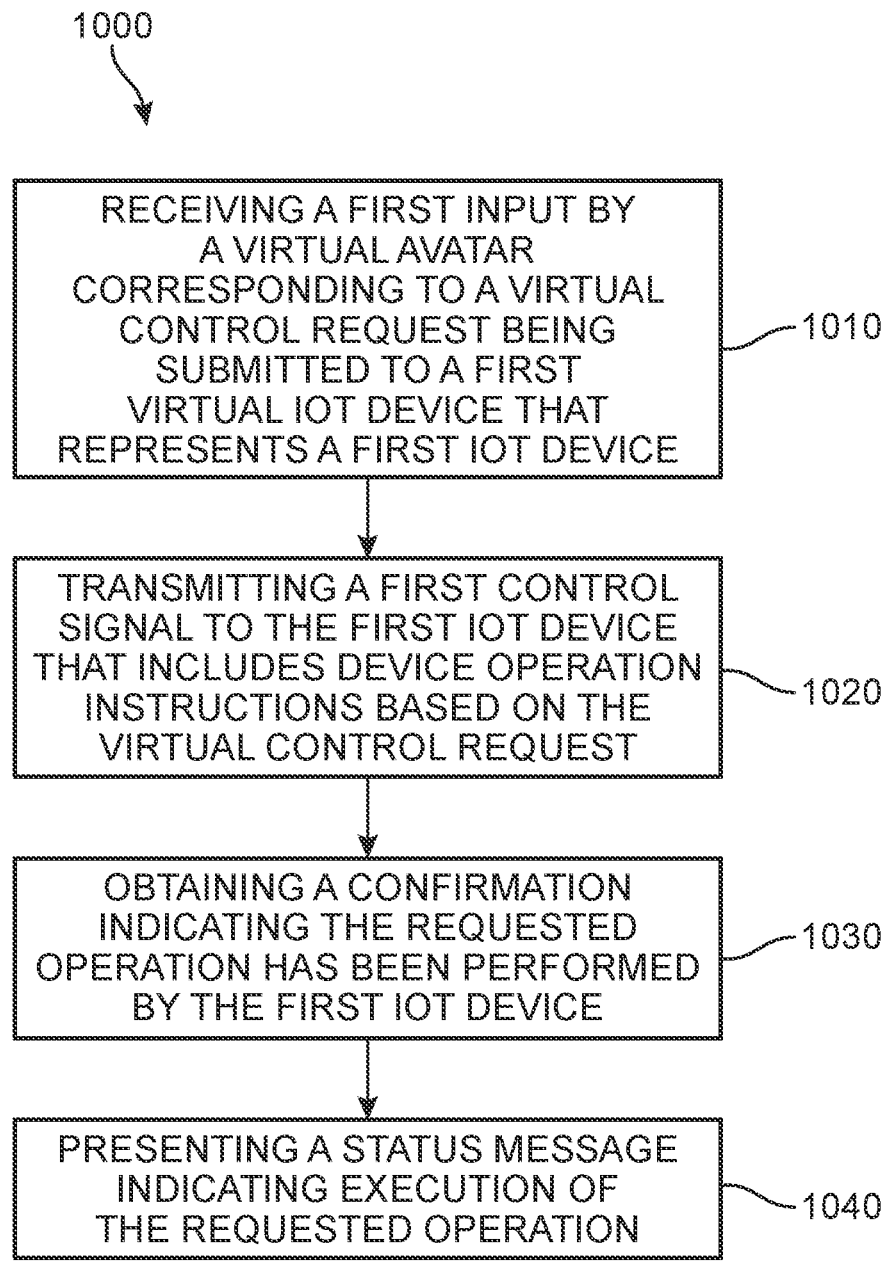
FIG. 10 is a flow diagram of a process for causing real-world changes in response to interactions with virtual objects, according to an embodiment.

FIG. 10 is a flow chart illustrating an embodiment of a method 1000 for causing real-world changes in response to interactions with virtual objects. The method 1000 includes a first step 1010 of receiving, at a client computing device, a first input by a virtual avatar representing a first user, the first input corresponding to a virtual control request being submitted to a first virtual IoT device that represents a first (real-world) IoT device. A second step 1020 includes transmitting, from the client computing device and in response to the first input, a first control signal to the first IoT device, the first control signal including device operation instructions based on the virtual control request. The first control signal is configured to cause an operation to be performed by the first IoT device corresponding to the operation selected by the user in the virtual environment. The method 1000 further includes a third step 1030 of obtaining, at the client computing device and from the first IoT device, a confirmation indicating the requested operation has been performed by the first IoT device, and a fourth step 1040 of presenting, via the first virtual IoT device, a status message indicating execution of the requested operation at the first (real-world) IoT device.

In other embodiments, the method may include additional steps or aspects. In one embodiment, the first IoT device is one of a thermostat (temperature/HVAC controller), lighting controller, audio controller (speakers), security manager (e.g., locks, window/door sensors, outdoor and indoor cameras), window treatment controller, and appliance controller. In another embodiment the first input is received during a virtual reality immersion experience of the first user. In some embodiments, the method 1000 also includes a step of presenting, via a virtual reality module of the client computing device, a simulated structure representing the first user's real-world home, wherein the first virtual IoT device is located inside the simulated structure.

In different embodiments, the method 1000 can also include steps of receiving, at the client computing device, a second input by (through/via) the virtual avatar corresponding to a navigation request to move the virtual avatar from an entryway of the simulated structure to a first location within the simulated structure, the first location including a second virtual IoT device corresponding to a second IoT device installed in the real-world home, and automatically making available, to the virtual avatar in the simulated structure, one or more options for interacting with the second IoT device (i.e., presenting the options in an interface associated with the virtually rendered device when the user's avatar approaches or is directly adjacent to the virtually rendered device).

In another example, the method can include additional steps of receiving, at the client computing device, a registration of a plurality of real-world IoT devices, the plurality including the first IoT device, connecting, from the client computing device, to the plurality of real-world IoT devices, receiving a first dataset from the plurality of real-world IoT devices, the first dataset including sensor data for multiple portions of a real-world building associated with the first user, creating, based on the first dataset, a virtual layout of at least some of the real-world building, and generating a simulation of the building based on the virtual layout.

In some embodiments, the method also includes a step of presenting, at the client computing device, options to interact with a virtual IoT device only when the virtual avatar is located in proximity to the virtual IoT device. In another embodiment, the method further includes steps of receiving, at the client computing device, a series of inputs describing of a real-world home of the first user, creating, based on the series of inputs, a virtual layout of at least some of the real-world home, and generating a simulation of the real-world home based on the virtual layout.

Other methods may be contemplated within the scope of the present disclosure. For example, in some embodiments, a method of improving safety outcomes for occupants of a real-world building using gamification is disclosed. The method includes a first step of presenting, at a first computing device, a simulation of a virtual building representing the real-world building, the simulation further including an emergency event occurring at a first location of the virtual building, a second step of receiving, at the first computing device, a first input by a first virtual avatar representing a first user, the first input corresponding to a navigation selection to move the first virtual avatar from a second location to a third location in the virtual building, a third step of moving, in the simulation and in response to receiving the first input, the first virtual avatar from the first location to the second location, and a fourth step of presenting, via the first computing device, a metrics dashboard comprising a first score assigned to the first virtual avatar based on navigation of the first virtual avatar in response to the emergency event.

In such embodiments, the method may include additional steps or aspects. In some embodiments, the third location is farther from the first location than the second location and the first score increases when the first input is received. In another example, the third location is closer to the first location than the second location and the first score decreases when the first input is received. In some embodiments, the method also includes steps of presenting, at a second computing device, the simulation, receiving, at the second computing device, a second input by a second virtual avatar representing a second user, the second input corresponding to a navigation selection to move the second virtual avatar from a fourth location to a fifth location in the virtual building, moving, in the simulation and in response to receiving the second input, the second virtual avatar from the fourth location to the fifth location, and presenting, via the first computing device, a metrics dashboard comprising both the first score as well as a second score assigned to the second virtual avatar based on navigation of the second virtual avatar in response to the emergency event. In another example, the method can also include steps of identifying, at the first computing device, an optimal route for exiting the virtual building based in part on the relative distance between the first location and the second location, and determining, at the first computing device, a value of the first score based in part on a comparison of the navigation of the first virtual avatar with the optimal route.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/ or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of causing real-world changes in response to interactions with virtual objects, the method comprising:
   receiving, at a client computing device, a first input by a virtual avatar representing a first user, the first input corresponding to a virtual control request being submitted to a first virtual IoT device that represents a first IoT device;
   transmitting, from the client computing device and in response to the first input, a first control signal to the first IoT device, the first control signal including device operation instructions based on the virtual control request;
   obtaining, at the client computing device and from the first IoT device, a confirmation indicating the requested operation has been performed by the first IoT device;
   presenting, via the first virtual IoT device, a status message indicating execution of the requested operation;
   presenting, via a virtual reality module of the client computing device, a simulated structure that corresponds to a real world structure, wherein the first virtual IoT device is located inside the simulated structure;
   presenting, via the virtual reality module of the client computing device, a virtual simulation of a disaster taking place inside the simulated structure that includes the simulated disaster interacting with the first virtual IoT device and the virtual avatar of the first user;
   generating a simulated interaction between the simulated disaster and the first virtual IoT device inside the simulated structure and determining a first time period between a commencement of the simulated disaster and the simulated disaster being detected by the first virtual IoT device;
   measuring the simulated interaction of the simulated disaster with the first virtual IoT device and the virtual avatar of the first user inside the simulated structure to determine whether the simulated interaction meets a predetermined total time threshold, the predetermined total time threshold being a total time for the virtual avatar of the first user to escape the simulated structure after the simulated disaster has commenced including the first time period between a commencement of the simulated disaster and the simulated disaster being detected by the first virtual IoT device; and
   generating a recommendation for changing an arrangement of the first IoT device and adding one or more secondary IoT devices in the real world structure so as to meet the predetermined time threshold.

2. The method of claim 1, wherein the first IoT device is one of a thermostat, lighting controller, audio controller, security manager, window treatment controller, and appliance controller.

3. The method of claim 1, wherein wherein the method includes a plurality of simulated disasters, and the step of generating recommendations includes recommendations for meeting the predetermined time threshold in each of the plurality of simulated disasters.

4. The method of claim 1, further comprising presenting, via the virtual reality module of the client computing device, a virtual reality training simulation wherein the virtual avatar interacts with the simulated structure and the simulation of the disaster in such a manner as to train the first user to successfully navigate the simulation of the disaster.

5. The method of claim 4, further comprising:
   receiving, at the client computing device, a second input by the virtual avatar corresponding to a navigation request to move the virtual avatar from an entryway of the simulated structure to a first location within the simulated structure, the first location including a second virtual IoT device corresponding to a second IoT device installed in the real-world home; and
   automatically making available, to the virtual avatar in the simulated structure, one or more options for interacting with the second IoT device.

6. The method of claim 1, further comprising:
   receiving, at the client computing device, a registration of a plurality of real-world IoT devices, the plurality including the first IoT device;
   connecting, from the client computing device, to the plurality of real-world IoT devices;
   receiving a first dataset from the plurality of real-world IoT devices, the first dataset including sensor data for multiple portions of a real-world building associated with the first user;
   creating, based on the first dataset, a virtual layout of at least some of the real-world building; and
   generating a simulation of the building based on the virtual layout.

7. The method of claim 1, further comprising presenting, at the client computing device, options to interact with a virtual IoT device only when the virtual avatar is located in proximity to the virtual IoT device.

8. The method of claim 1, further comprising:
   receiving, at the client computing device, a series of inputs describing of a real-world home of the first user;
   creating, based on the series of inputs, a virtual layout of at least some of the real-world home; and generating a simulation of the real-world home based on the virtual layout such that the simulated structure corresponds to the real-world home of the first user.

9. A system for causing real-world changes in response to interactions with virtual objects, the system comprising a processor and machine-readable media including instructions which, when executed by the processor, cause the processor to:
receive, at a client computing device, a first input by a virtual avatar representing a first user, the first input corresponding to a virtual control request being submitted to a first virtual IoT device that represents a first real world IoT device;
transmit, from the client computing device and in response to the first input, a first real world control signal to the first real world IoT device, the first real world control signal including device operation instructions based on the virtual control request;
obtain, at the client computing device and from the first real world IoT device, a confirmation indicating the requested operation has been performed by the first real world IoT device;
present, via the first virtual IoT device, a status message indicating execution of the requested operation;
present, via a virtual reality module of the client computing device, a simulated structure representing the first user's real-world home, wherein the first virtual IoT device is located inside the simulated structure;
present, via the virtual reality module, a virtual simulation of a fire taking place inside the simulated structure that includes the simulated fire interacting with the first virtual IoT device and the virtual avatar of the first user;
generate a simulated interaction between the simulated disaster and the first virtual IoT device inside the simulated structure and determining a first time period between a commencement of the simulated disaster and the simulated disaster being detected by the first virtual IoT device;
measure the simulated interaction of the simulated disaster with the first virtual IoT device and the virtual avatar of the first user inside the simulated structure to determine whether the simulated interaction meets a predetermined total time threshold, the predetermined total time threshold being a total time for the virtual avatar of the first user to escape the simulated structure after the simulated disaster has commenced including the first time period between a commencement of the simulated disaster and the simulated disaster being detected by the first virtual IoT device; and
generate a recommendation for changing an arrangement of the first IoT device and adding one or more secondary IoT devices in the user's real world home so as to meet the predetermined time threshold.

10. The system of claim 9, wherein the first IoT device is one of a thermostat, lighting controller, audio controller, security manager, window treatment controller, and appliance controller.

11. The system of claim 9, wherein the method includes a plurality of simulated disasters, and the step of generating recommendations includes recommendations for meeting the predetermined time threshold in each of the plurality of simulated disasters.

12. The system of claim 9, wherein the instructions further cause the processor to test, via the virtual reality module of the client computing device, an interaction between the simulated structure and the first virtual IoT device in response to a plurality of different simulated fires in the simulated structure.

13. The system of claim 12, wherein the instructions further cause the processor to: receive, at the client computing device, a second input by the virtual avatar corresponding to a navigation request to move the virtual avatar from an entryway of the simulated structure to a first location within the simulated structure, the first location including a second virtual IoT device corresponding to a second IoT device installed in the real-world home; and
automatically make available, to the virtual avatar in the simulated structure, one or more options for interacting with the second IoT device.

14. The system of claim 9, wherein the instructions further cause the processor to:
receive, at the client computing device, a registration of a plurality of real-world IoT devices, the plurality including the first IoT device;
connect, from the client computing device, to the plurality of real-world IoT devices;
receive a first dataset from the plurality of real-world IoT devices, the first dataset including sensor data for multiple portions of a real-world building associated with the first user;
create, based on the first dataset, a virtual layout of at least some of the real-world building; and
generate a simulation of the building based on the virtual layout.

15. The system of claim 9 wherein the instructions further cause the processor to present, at the client computing device, options to interact with a virtual IoT device only when the virtual avatar is located in proximity to the virtual IoT device.

* * * * *